US007152793B2

(12) United States Patent
Ichihara

(10) Patent No.: US 7,152,793 B2
(45) Date of Patent: Dec. 26, 2006

(54) SHEETS HANDLING MACHINE AND SHEETS DISCRIMINATION METHOD

(75) Inventor: Seiji Ichihara, Owariashi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 65 days.

(21) Appl. No.: 10/998,623

(22) Filed: Nov. 30, 2004

(65) Prior Publication Data

US 2005/0145696 A1 Jul. 7, 2005

(30) Foreign Application Priority Data

Jan. 6, 2004 (JP) ............................ 2004-000740

(51) Int. Cl.
*G06K 7/00* (2006.01)
*G07F 19/00* (2006.01)

(52) U.S. Cl. ...................................... 235/440; 235/379

(58) Field of Classification Search ................ 235/379, 235/435, 439–441, 449, 451, 454; 902/1–7
See application file for complete search history.

(56) References Cited

U.S. PATENT DOCUMENTS

| | | | | |
|---|---|---|---|---|
| 3,765,523 | A * | 10/1973 | Nakanishi | 271/180 |
| 6,547,151 | B1 * | 4/2003 | Baldi | 235/492 |
| 6,659,353 | B1 * | 12/2003 | Okamoto et al. | 235/492 |
| 6,918,535 | B1 * | 7/2005 | Brosow | 235/379 |
| 7,003,256 | B1 * | 2/2006 | Kumakura et al. | 399/366 |
| 2003/0163696 | A1 * | 8/2003 | Rancien | 713/170 |
| 2004/0098340 | A1 * | 5/2004 | Scholt et al. | 705/45 |
| 2004/0100363 | A1 * | 5/2004 | Lane et al. | 340/5.86 |

FOREIGN PATENT DOCUMENTS

| | | | |
|---|---|---|---|
| DE | 198 33 746 | A1 | 2/2000 |
| EP | 1 139 302 | A1 | 10/2001 |
| JP | 2003178185 | | 6/2003 |
| WO | WO 03005143 | A2 | 1/2003 |
| WO | WO 03/054808 | A2 | 7/2003 |

* cited by examiner

*Primary Examiner*—Jared J. Fureman
*Assistant Examiner*—Jamara A. Franklin
(74) *Attorney, Agent, or Firm*—McDermott Will & Emery LLP

(57) ABSTRACT

There is demand that discrimination of bills or securities by means of IC chip should be adopted. If the conveying speed of securities and banknotes is slowed down substantially by implementing discrimination by an IC chip, this gives rise to delays of the transaction process, which causes inconvenience to the user. For instance, security can be preferentially made high for high-value banknotes and securities based on the state of circulation of IC-mounted banknotes and securities. ID information in the IC chip may be read in advance, the ID information may be referred to the ID information center, while reference is being made to the center, a discrimination result other than by the IC chip may be obtained, and by comparing the other discrimination result with the result of reference, the discrimination accuracy may be improved by using discrimination by the IC chip without greatly slowing down the conveying speed.

18 Claims, 4 Drawing Sheets

| DISCRIMINATION MODE | 10,000-YEN NOTE | 1,000-YEN NOTE |
|---|---|---|
| | DISCRIMINATION BY IC CHIP | |
| A | REQUIRED | REQUIRED |
| B | REQUIRED | NOT REQUIRED |
| C | NOT REQUIRED | NOT REQUIRED |

SHEETS HANDLING MACHINE AND SHEETS DISCRIMINATION METHOD

The present application claims priority form Japanese application JP 2004-000740 filed on Jan. 6, 2004, the content of which is hereby incorporated by reference into this application.

BACKGROUND OF THE INVENTION

The present invention relates to a machine and a method for discriminating sheets, such as banknotes and securities.

The bill discriminator to discriminate banknotes and securities is provided in teller machines used in banking facilities and in money changers and automatic vending machines in general.

Above all, JP-A-2003-178185 discloses a technology of issuing securities by an issuing means on the basis of a decision result by a determining means. In this technology, a sheets handling machine comprises a reading means for no-contact reading of ID information stored in an IC chip embedded in the securities to prevent forgery and interpolation of the securities, and a determining means for determining the authenticity of the securities by referring the read ID information to the security information database storing ID information by which to identify not-issued securities.

SUMMARY OF THE INVENTION

However, so far there have been hardly any banknotes or securities with embedded IC chips in circulation. Supposing that IC-chip-embedded banknotes or securities were begun to be distributed right now, it would take some time before they circulate around among the users. Under the circumstances, if banknotes or securities without IC chips were determined to be counterfeits hastily only because they do not have IC chips, there may be inconvenience for the users. In the meanwhile, there is demand that discrimination of bills or securities by means of IC chip should be adopted as soon as possible.

In discrimination by IC chip, electricity is generated and supplied to the IC chip which transmits electric information, which is stored in the IC chip, and reference may sometimes be made to a host office based on the transmitted information, which is likely to take longer time than discrimination by reading the surface (printed pattern or magnetized characters) of banknotes or securities. However, in order to gain time for this operation, if the conveying speed of banknotes or securities is slowed substantially, this leads to delays of the transaction process, which causes inconvenience to the user.

Under the current situation, it is required that improvements should be made to the current discrimination technology in such a way to resolve two conflicting problem: to improve the reliability of discrimination and increase the convenience for users.

This improvement of the current technology may be achieved by adopting means of switching over whether or not to use discrimination by IC chip as a requirement for determining the authenticity according to the kinds of banknotes or securities, security may be preferentially made high for high-value banknotes and securities based on the state of circulation of IC-mounted banknotes and securities, for instance.

In view of a case where discrimination by the IC chip takes time, for example, ID information in the IC chip may be read in advance, the ID information may be referred to the ID information center, while reference is being made to the center, a discrimination result other than by the IC chip may be obtained, and by comparing the other discrimination result with the result of reference, the discrimination accuracy may be improved by using discrimination by the IC chip without greatly slowing down the conveying speed.

Thus, discrimination by using electric information on the IC chip may be executed with consideration given to the convenience to the users, for example.

Other objects, features and advantages of the invention will become apparent from the following description of the embodiments of the invention taken in conjunction with the accompanying drawings.

DESCRIPTION OF THE EMBODIMENT

An embodiment will be described by referring to 1,000-yen notes and 10,000-yen notes as examples of securities and banknotes. Suppose that among 1,000-yen and 10,000-yen notes, there are some with IC chips and others without IC chips even though printed designs are almost identical. Among other examples of applicable sheets are paper moneys, which include 5,000-yen notes and other notes (such as government notes, bank notes in general, convertible paper money, and inconvertible paper money) and other kinds of bank notes than Japanese-yen notes, bank drafts, checks, stocks, bonds, bills of lading, warehouse bonds, carriage notes, and gift coupons. Apparatuses equipped with a bill discriminator will be described by referring to the Automatic Teller Machine (ATM) used in banking facilities and the Bill Recycle Module (BRM) incorporated in the ATM, for example. It ought to be noted that the ATM and the BRM may be collectively referred to as a bills handling machine or a sheets handling machine. The word "Recycle" here means that notes, which were received and stored, are used to pay out notes afterwards. However, to recycle notes is not an indispensable requirement in this embodiment. The respective elements in the external view drawing, block diagrams and flowcharts may be subject to free choice and may be recombined. Moreover, the present invention is not limited to the embodiment shown herein, but may be applied to various modes of embodiment.

Figure 1:
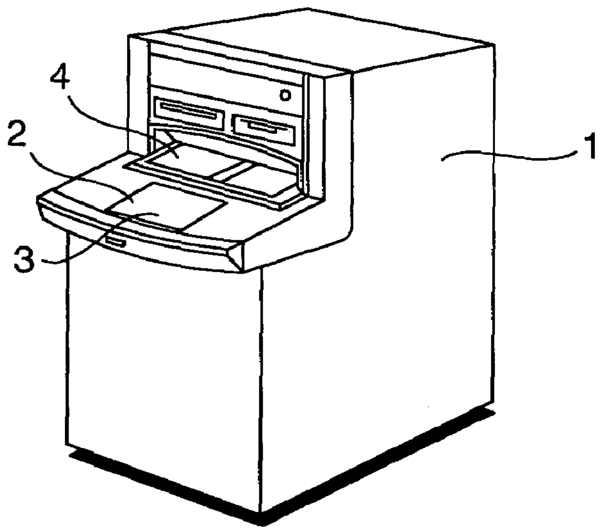
FIG. 1 shows an example of an external view of an automatic teller machine (ATM)

FIG. 1 is an external view drawing of an ATM 1. On the front left of the machine in FIG. 1 is the user's side. Provided on the user side are a display 2 for showing guidance to the user, keys 3 (operation panel) which are operated by the user to input data with keys or a touch panel used in response to a prompting message on the display, and a money in-out slot 4 to input and/or output money. A shutter is provided above the money in-out slot 4, and the user's putting notes into the inside of the shutter is referred to as input (receipt by the machine) and the user's withdrawing notes from the inside of the shutter is referred to as output (payout by the machine).

Figure 2:
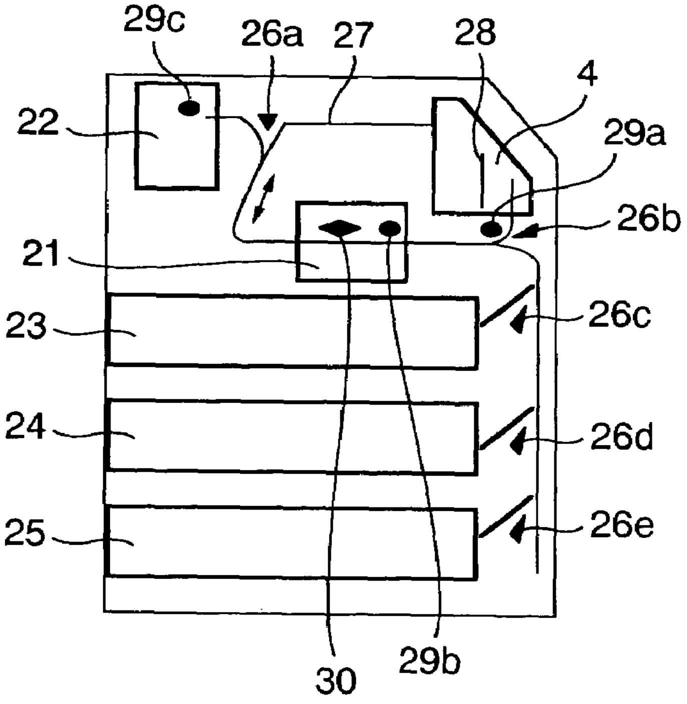
FIG. 2 shows an example of a sectional view of a bill recycle mechanism (BRM)

FIG. 2 is a structure diagram of the BRM 20. On the right side of the diagram is the user side. A middle plate 28, which is mounted in the money-in-out slot 4, is a partition between a money-in block and a money-out block. The money-in block and the money-out block may not be in one space but may be formed as separate parts. The BRM 20 includes, in addition to the money in-out slot 4, a bill discriminator 21 to examine notes having denominations, such as 1,000 yen or 10,000 yen, or old/new types and determine the kinds and the authenticity of the notes (including presuming a note to be genuine when a measured value meets a standard; this is equally true in the following), a temporary stocker 22 to sequentially store notes that have passed the bill discriminator 21 and pay out the notes in a forward order or in a reverse order, a reject box 23 to store the notes which are not paid out because they are dirty or old type notes, for example, a 1,000-yen notes box 24 to store 1,000-yen notes to pay out, a 10,000-yen notes box 25 to store 10,000-yen notes to pay out, gates 26*a*~26*e* to change over the conveying direction, and a conveying path 27 to convey notes placed between belts or rollers. The bill discriminator 21 includes a surface information reader 30 to read surface information, such as patterns or magnetic characters on the surface of notes. The surface information reader 30 includes a spectroscopic unit to read printed patterns or the like on the surface of notes by optical information using visible light, infrared light, or ultraviolet light, for example, and a magnetic ink reader to detect magnetic ink. The reject box 23, the 1,000-yen note box 24, and the 10,000-yen note box 25 are collectively referred to as bill storing boxes. As an example, the 1,000-yen note box 24 for 1,000-yen notes and the 10,000-yen note box 25 for 10,000-yen notes have been cited, but it is needless to say possible to provide a bill storing box for 5,000-yen notes.

The BRM 20 includes, above all, an IC reader (also referred to as an electric information reader) 29 to read electric information stored in memory in an integrated circuit (IC). The IC reader includes an antenna for irradiating and receiving an electromagnetic wave, an irradiator to radiate an electromagnetic wave, and a receiver to receive an electromagnetic wave to analyze a response from the IC. The internal memory of the IC stores information for identifying encrypted individual bodies (ID) as electric information (chiefly as digital information). When radiated by a special electromagnetic wave of specific wavelength, period, amplitude, etc., the IC generates electricity in it by using this electromagnetic wave, and transmits stored information. If information has been encrypted, it may be decrypted in the IC or on the receiver side. Note that the IC is formed generally on a semiconductor chip and encased (which is referred to as an IC chip), but this IC is not limited to this form of structure. ID information may be read by using a contact-type electrode, not by no-contact reading, which uses an electromagnetic wave radiated from the antenna. However, a no-contact type IC chip is used in the description of an embodiment and a modified embodiment of the invention.

The installation of the IC reader 29 is not limited to the inside of the bill discriminator 21. For example, at least one IC reader may be installed in the vicinity of the money-in block, say at 29*a*, in the inside 29*c* of the temporary stocker 22, for example. When an IC reader is installed at 29*a* or 29*b* on the upstream side of the surface information reader 30 (i.e., on the upstream of the conveying path when notes are conveyed from the money-in block, that is to say, the IC reader 29*a*, 29*b*, the surface information reader 30, and the temporary stocker 22 are arranged in this order from the upstream to the downstream when notes from the money-in block are conveyed on the conveyor), electric information on the IC can be read before the surface of a note is read by the surface information reader 30. By this arrangement, for example, the electric information that was read can be referred for inquiry to a host office quickly (which will be described later). Particularly, when an IC reader 29 is mounted in a position near the money-in block where the notes do not move so fast, because the conveying speed is relatively slow, even if it takes time from irradiation of electromagnetic wave to the IC until a response comes from the IC chip (which constitutes a process of reading electric information), the electric information can be read securely and electric information can be read earlier than the reading of surface information. Also when an IC reader 29 is installed in the temporary stocker 22 (29*c*), the conveying speed of notes is relatively slow (the conveyance is slowed substantially), making it relatively easy to read electric information on the IC.

Figures 3, 4:
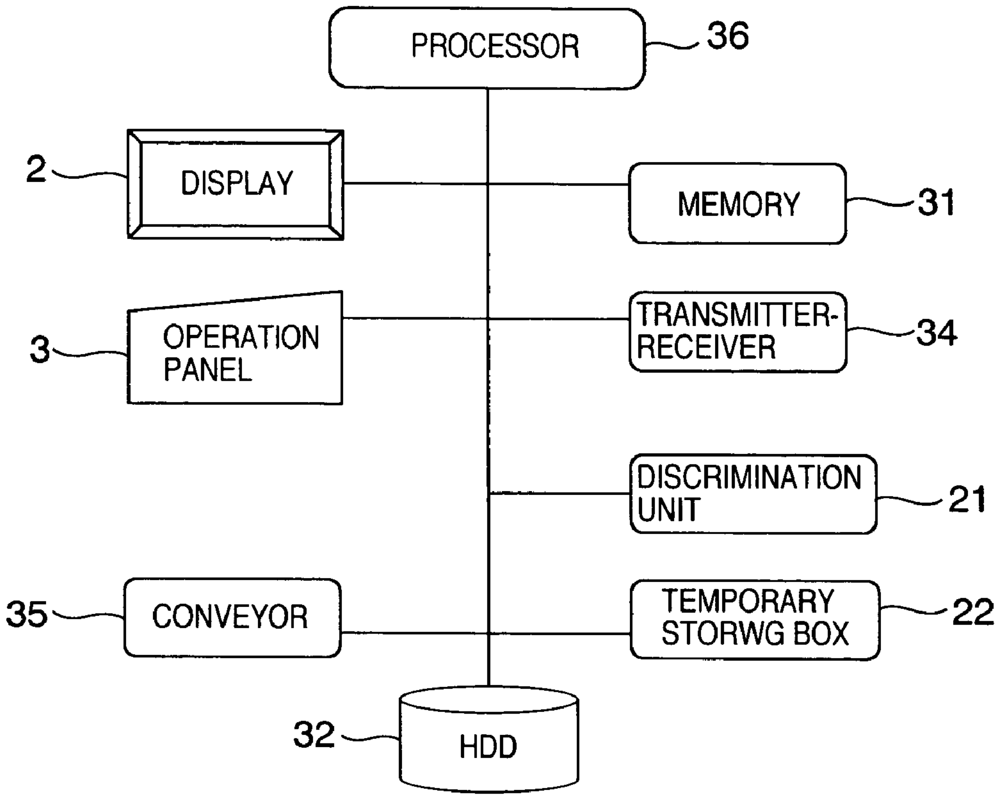
FIG. 3 shows an example of a function block diagram of the automatic teller machine.
FIG. 4 shows an example of a discrimination mode selection table.

FIG. 3 is a function block diagram of the ATM 1. The ATM 1 includes a processor 36 (also referred to as a processing unit or a control unit), a memory 31 (also referred to as a main memory), an HDD 32 for storing a control program and various setting data (hard disk drive, but this unit is not limited to this type and may also be referred to as auxiliary memory), a transmitter-receiver that connects to the host office through a line (also referred to as an interface or an inquiry unit), and a conveyor 35 incorporating conveyor motors for driving belts and rollers of the conveying path 27. The host office, including a server and a database, for example, manages various items of information.

FIG. 4 shows an example of table 40 stored in the HDD 32. The table 40 defines "required" or "not required" for discrimination using electric information on the IC chip (also referred to as IC discrimination or a second discrimination) for each mode. In the table 40, discrimination modes A~C are shown as examples. The discrimination mode A 41 is a mode which requires IC discrimination for 1,000-yen notes and 10,000-yen notes, and is assumed to be applied when notes with IC chips have become sufficiently prevalent in the market. The discrimination mode B 42 is a mode that requires IC discrimination for relatively high-denomination 10,000-yen notes but does not require IC discrimination for relatively low-denomination 1,000-yen notes and is assumed to be applied while IC-chip-mounted notes are being put into circulation but they are still in a transition period, with IC-chip-less notes still in wide circulation. The discrimination mode C 43 is a mode that does not require IC discrimination for both 1,000-yen notes and 10,000-yen notes and that is assumed to be applied when before notes with IC chips are put into circulation or they are in an early stage of transition.

A discrimination mode is set by selecting among those modes in response to an instruction from the host office via the transmitter-receiver 34 or an instruction from a person in charge, who input it through the operation panel 3. A set mode is stored in at least one of the HDD 32 and the memory 31. As described above, by changing over whether or not to execute discrimination using the IC chip according to the denominations, notes can be discriminated with high accuracy by IC discrimination in the descending order of the notes' requirement for IC discrimination based on the state of circulation of notes with IC chips. On the other hand, consideration may be given so as not to cause serious inconvenience to users who cannot use notes without chips even if they are genuine notes.

The control of a device for discriminating banknotes will be described by taking an embodiment of the present invention as an example with reference to FIGS. 1 to 4. A high-value note and a low-value note in FIGS. 5 and 6 correspond to a 10,000-yen note and a 1,000-yen note, respectively. If the modes are further increased, the steps in the flowcharts are to be changed accordingly.

In this embodiment, a check is first made to see if a note has an IC chip, and then conventional discrimination is used depending on modes.

Figure 5:
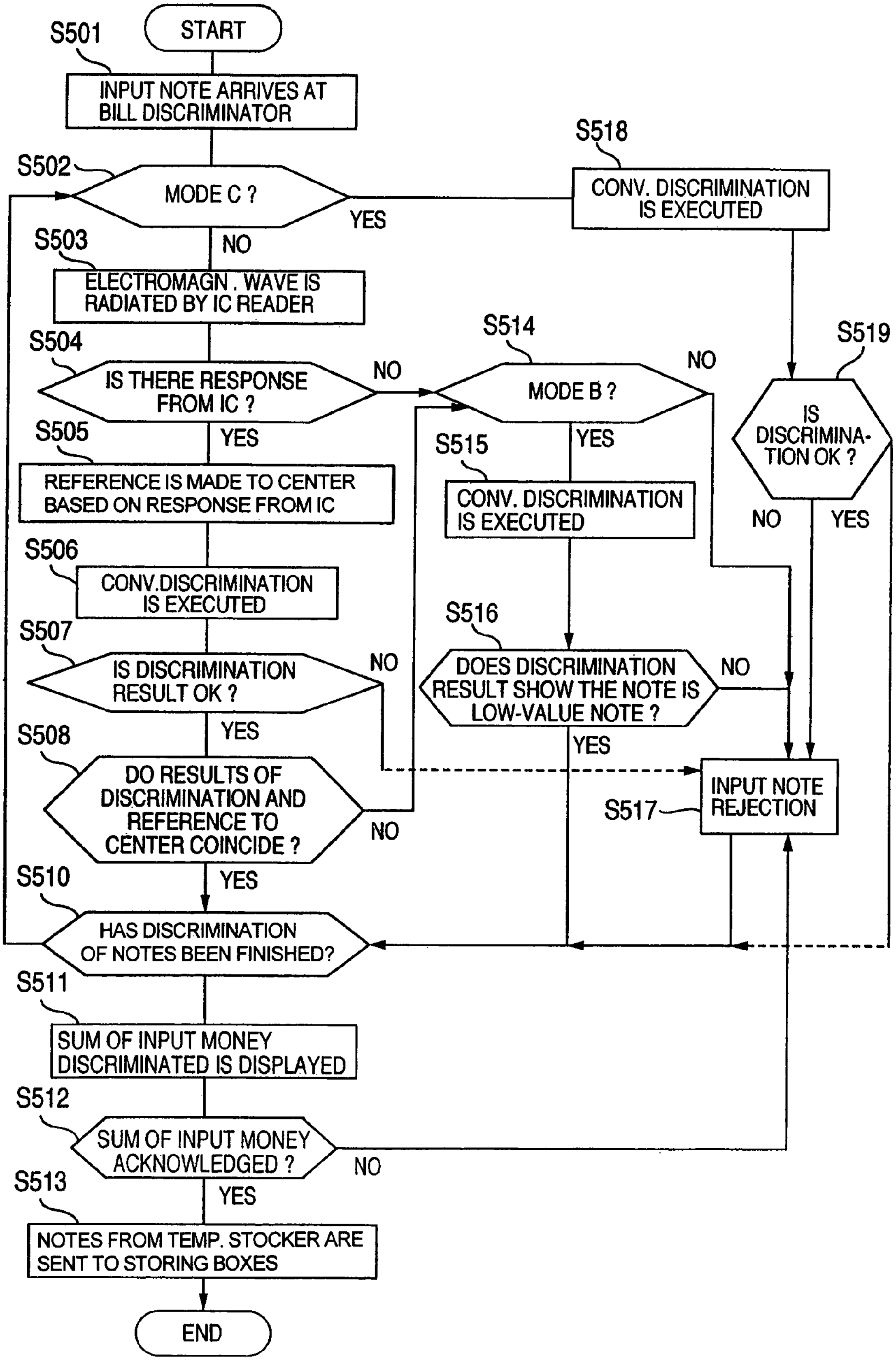
FIG. 5 shows an example of a flowchart using conventional discrimination after discrimination by IC chip.

FIG. 5 is a flowchart showing a process for controlling the ATM 1 and the BRM 20 by using setting data and a program stored in the memory 31 or the HDD 32.

When it is detected that notes were deposited by a user into the money in-out slot, the shutter is closed, the notes are sent out on the conveying path 27 from the money in-out slot 4, pass through the gate 26*b*, and are brought to the bill discriminator 22 by the conveyor 35 (S501).

At this time, if the currently set discrimination mode is mode C 43 (Yes in S502), conventional discrimination is only executed (S518). The conventional discrimination (also referred to as first discrimination) here means discrimination that does not use electric information on the surface of the IC chip of a note, and includes discrimination by the surface information reader's reading surface information in the form of patterns or magnetic characters, for example, on the surface of a note. If a note is identified as a genuine note (Yes in S519), discrimination is finished without executing discrimination using the IC chip, and a decision is made to see if there is any other note input (S510). If the decision is that the note is non-genuine (false) (No in S519), this note is treated as a rejected note and sent from the bill discriminator 21 via the gate 26 to the money-out block of the money in-out slot 4 (S517). When the discrimination of the note input from the money in-out slot is finished (Yes in S510), the shutter of the money-in-out slot 4 opens to return the rejected note back to the user.

If the discrimination mode C 43 is not set in Table 40, the IC reader 29 radiates an electromagnetic wave (No in S502; S503).

When the IC reader 29 receives a response from the IC chip (Yes in S504), conventional discrimination is executed (S505), and the information received from the IC chip is referred for inquiry to the host office (center) through the transmitter-receiver 34. If information necessary for discrimination of the note can be obtained only from the information from the IC chip, the reference need not be made. However, an IC chip which can be embedded in the sheet of a banknote is relatively small. For this reason, the amount of information stored may not be so large, or a note may not have a function to write in optional information, such as a denomination or a serial note number, after the IC is manufactured. In this case, it is conceivable that information on the notes should be associated with specific numbers (serial numbers) of IC chips when related information is managed by the host office, so that reference to the host office is required when discriminating IC-chip-mounted notes.

From received information on the IC chip, the host office searched the database for information of the corresponding note, such as a denomination, serial note number, etc., and sends a reply to the transmitter-receiver 34. If a discrimination result in S505 is OK (Yes in S507), the discrimination result is compared with the information about the note, sent back from the host office, to see if they coincide or not (S508). If they coincide in the comparison in S508, the note is identified as genuine, but if they do not coincide, the note is identified as non-genuine (namely, a false note). In this manner, the reliability of discrimination is enhanced by using IC chip.

When the IC reader 29 failed to receive a response from the IC chip, the processor 36 decides if the currently set mode is mode B (S514). If the mode in effect is mode B, conventional discrimination is subsequently executed (S515). If the result of the conventional discrimination in S515 is that the note is a low-value note, the note is identified as genuine (Yes in S516). The reason is that sufficient discrimination should be preferably carried out for high-value notes; however, as long as low-value notes are concerned, if a rightful evaluation is obtained in conventional discrimination, this should be regarded as acceptable in consideration of convenience for users, but this is not permitted without restriction. For example, an upper limit is set for a number of notes for each user, for one day, and for each transaction and so on. If the limit number is exceeded, measures are automatically taken to switch from mode B to mode A, for example, by which security can be ensured. By this arrangement, even when it is decided that the IC chip is not used in discrimination of stocks and bonds or banknotes of relatively low value, a limit is set for a number of times, for example, to protect against damage from forgery in low-value securities and banknotes. Note that if a decision is No in S524, discrimination is in mode A which requires IC discrimination for all notes; therefore, if there is any note which was not subjected to IC discrimination, this note is not put to conventional discrimination and is classified as a rejected note at the input stage. If the note was not identified as a low-value note either (No in S516), the note is classified as non-genuine and treated as a rejected note.

When discrimination of notes input from the money in-out slot 4 has been finished, the display 2 shows a total sum of notes, which were not identified as non-genuine in both IC discrimination and convention discrimination, and the processor 36 waits for the user to input an acknowledgement signal on the operation panel 3 (S511). In response to the acknowledgement signal input (Yes in S512), the processor 36 sends the notes from the temporary stocker 22 via the gate 26*a* and stores the notes in the 1,000-yen note box 24 and the 10,000-yen note box 25 classified by their denominations (S513). The IC-chip-less notes may be collected into the reject box 23 to prevent them from being recycled into the market and to accelerate the transition to IC-chip-mounted notes.

Incidentally, when reference is made for inquiry to the host office in S505, it is likely to take time before a reply arrives depending on the condition of transmission lines, for example. In such a case, if it is necessary to wait for a result of reference to come while a note remains in the bill discriminator 21, the conveyance will be delayed. If the result of conventional discrimination in S507 is OK (Yes), the note is sent from the bill discriminator 21 to the temporary stocker 22, and in the memory 31, the numerical order of the notes to be stored are associated with their results of conventional discrimination by the bill discriminator 21, and when a reply comes from the host office, a notified result should preferably be compared with the result of conventional discrimination stored in the memory 31. As a result of comparison, if the results do not coincide, after it is decided that discrimination of an input note has been finished in S510, the note is sent from the temporary stocker 22 to the money in-out slot 4 to be returned to the user. At this time, after the sum of money input is confirmed by the user (S512), when genuine notes, which have received a decision of coincidence, are sent out from the temporary stocker 22 and stored in the bill storing boxes 23~25 (S513), the notes, which have received a decision of discordance, may be sent out from the temporary stocker 22 and conveyed to the money in-out slot 4.

However, in the above method, before acknowledging the sum of money input (S512), the user is unable to know the presence of rejected note and how many it is. In other words, the notes identified as non-genuine by IC discrimination and stored in the temporary stocker 22 are not counted in the sum of money input, but an exact sum of the money input is ungraspable to the user because the sum of non-genuine notes have not been rejected at the input stage at the time point of S512, so that it is impossible for him to decide whether a sum of money input is correct or not. In this respect, the presence of rejected notes and the number of the notes rejected at input stage may be displayed in S511. More preferably, before S512, the notes in the temporary stocker 22, for which the results of IC discrimination coincide with the results of conventional discrimination, are received tentatively in the bill storing boxes 23~25, but the notes that experienced a decision of discordance in discrimination are sent back to the money in-out slot 4. In this method, it is possible for the user to inspect or touch the notes rejected at input stage before acknowledging the sum of money input. When any note was tentatively accepted before S512, if this note was input without the user's confirmation in S512, the note tentatively accepted is sent out from the bill storing box to the money in-out slot 4 to be returned to the user (S517).

In this embodiment, an IC reader 29 is preferably installed upstream of the surface reader 30 (money is input from the money-in block), that is, at 29*a* or 29*b* in FIG. 2, for example. Because this makes it possible to obtain electric information on the IC chip very soon, facilitating the execution of S505. However, it is also possible to achieve this embodiment by software as a way of circumventing constraints of the layout. More specifically, the surface information of a note may be firstly obtained by the surface information reader 30 and stored in memory, and then electric information may be read by the IC reader 29 based on stored information, and after this, the operation of S506 may be executed. Besides the above-mentioned advance acquisition of surface information, another course of actions is possible; namely, conventional discrimination in S506 may be executed ahead of the operation of S503, the result of conventional discrimination is stored in memory, and according to stored result of conventional discrimination, IC discrimination is executed, and after this, the operations of S507 and S508 may be executed.

In the above-mentioned embodiment, it is arranged that a note is first checked to see if the note includes an IC chip, and then conventional discrimination is executed depending on modes. Description will be made of a modification of this embodiment of the present invention, in which conventional discrimination is first executed, and discrimination by using the IC chip of the note depending on modes.

Figure 6:
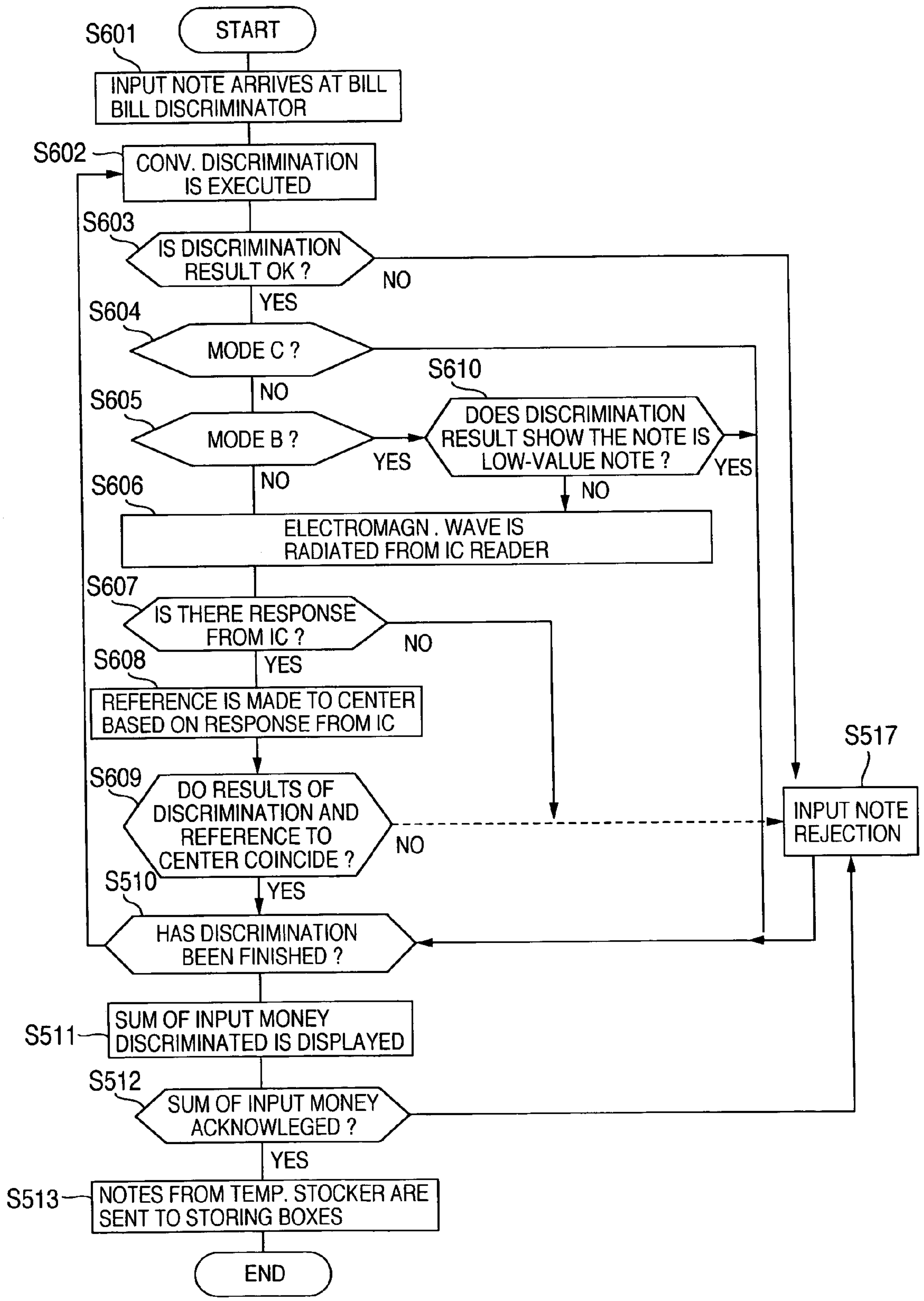
FIG. 6 shows a modification of the flowchart using discrimination by IC chip after conventional discrimination.

FIG. 6 is a flowchart showing the process of the processor 36 controlling the ATM 1 and BRM 20 by using setting data and a program stored in the memory 31 or the HDD 32.

When an input note is conveyed by the conveyor 35 from the money in-out slot to the bill discriminator 21 (S601), conventional discrimination is first of all executed in the embodiment.

At this point in time, if a discrimination result is no good (No in S602), the note is conveyed from the bill discriminator 21 to the money in-out slot 4, not to the temporary stocker 22. (Refer to the related description about S517 in FIG. 5.)

If the discrimination result is OK and the mode in Table 40 is C 43, the process proceeds directly to the execution of conventional discrimination on the next note, but if the mode is neither mode C nor mode B (No in step 604 and No in step S605, in other words, if the mode is mode A), the IC reader 29 radiates an electromagnetic wave (S606).

If the mode is mode B and the result of conventional discrimination shows that the note is a high-value note, but not a low-value note (Yes in step 605, No in step 610), the IC reader radiates an electromagnetic wave (S606).

If the IC reader radiates an electromagnetic wave according to the result of conventional discrimination, when a response cannot be received from the IC chip, it is decided that the note is false, and the note is rejected at input stage (No in S609). The steps to be executed subsequently are the same as in S510~S513 described with reference to FIG. 5.

Incidentally, when it takes relatively long to obtain a response when an electromagnetic wave is radiated to the IC chip and therefore the conveying speed at which a note passes through the bill discriminator 21 cannot be increased so much, for example, it is helpful to provide an IC reader 29, say, at 29*c* in FIG. 2. The reason is as follows. Because a note is stored in the temporary stocker 22, the conveying speed of a note in the temporary stocker 22 is slower than in the bill discriminator 21 (particularly, when a note is stopped for storage). What is advantageous is that if it is arranged for an electromagnetic wave to be radiated at this point in time, this helps gain time until a response arrives. In this modification, IC discrimination is used according to the result of conventional discrimination, and therefore this modification is suitable for a layout that provides an IC reader 29 downstream of the surface information reader 30.

The embodiment, which has been described, provides an advantage over the modification described above. That is to say, in anticipation of a case where it takes time when the information from the IC chip is referred for inquiry to the host office, it is arranged that transmission to the host office can be made quickly. In mode B, if there is no response from the IC chip, in this embodiment, it is possible to specialize the operation to conventional discrimination for low-value notes, in other words, the operation can be limited to acquisition of surface information from 1,000-yen notes, for example, making it possible to execute conventional discrimination with high efficiency.

On the other hand, the modification has the following advantage over the embodiment. Since after conventional discrimination has been done, a decision can be made whether or not to radiate an electromagnetic wave. Therefore, radiation of an electromagnetic wave can be prevented when radiation is not required. For example, when an IC reader 29 is installed in the temporary stocker 22, because the temporary stocker 22 is located downstream of the bill discriminator 21 as viewed from the money in-out slot 4, there is time to spare before a decision is made whether to radiate an electromagnetic wave based on the result of conventional discrimination by the bill discriminator 21.

Description has been chiefly made of differences when IC discrimination and conventional discrimination are executed in this order and in reverse order in the embodiment and its modification, respectively. However, concern need not be limited to a problem of which to execute earlier or later between IC discrimination and conventional discrimination. For example, IC discrimination and conventional discrimination may first be executed regardless of modes, and results of those discriminations may be stored in memory, and whether either one or both of results to use may be decided according to modes of Table 40. In this case, IC information and surface information may be read at the same time. IC discrimination is used in advance is in the embodiment, and conventional discrimination is used in advance in its modification. In addition, without setting a specific before-after relation in the use of results of IC discrimination and conventional discrimination, by comparing both results, a decision may be made if they coincide or not.

In the embodiment and the modified embodiment described above, it is possible to conceive a simplified method which, though security is low because the result of a response from the IC is referred for inquiry to the center, if the result of conventional discrimination is OK (the note is identified as genuine) and a response came from the IC chip, without reference of the result to the center, a decision is given that a final result of discrimination identifies the note as genuine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sheets handling machine for handling sheets, comprising:

a surface information reader for reading surface information on a sheet;

an electric information reader for reading electric information stored in an integrated circuit in the sheet; and a processor for switching over between using and not using surface information read by the surface information reader and electric information read from the electric information reader in discrimination of a sheet.

2. The sheets handling machine according to claim 1, wherein the switching by the processor is carried out according to a denomination value of the sheet discriminated based on the surface information.

3. The sheets handling machine according to claim 1, wherein the processor has an upper limit to a number of times of not using the electric information in discrimination of the sheet.

4. The sheets handling machine according to claim 1, further comprising:

an inquiry unit for transmitting electric information read from the electric information reader through a line, to an office, receiving information regarding the sheet, which corresponds to the electric information transmitted, and sending the received information regarding the sheet to the processor.

5. The sheets handling machine according to claim 4, wherein the processor, when using the electric information in discrimination of the sheet, compares information regarding the sheet from the inquiry unit with a result of discrimination based on the surface information.

6. The sheets handling machine according to claim 1, wherein:

the surface information reader includes a spectroscopic unit for obtaining various items of optical information on a printed surface of a sheet as surface information, and the electric information reader includes an antenna for radiating an electromagnetic wave to the integrated circuit on the sheet to generate electricity, and receiving an electromagnetic wave transmitted from the integrated circuit which generates electricity.

7. The sheets handling machine according to claim 1, further comprising:

an input unit for receiving sheets from a user;

a conveyor for conveying sheets;

a temporary storing unit for sequentially storing sheets received from the inlet unit;

a storing unit for storing sheets stored in the temporary storing unit; and an output unit for ejecting sheets to the user.

8. The sheet handling machine according to claim 7, wherein the input unit, the electric information reader, the surface information reader, and the temporary storing unit are arranged on a conveying path in the order of the input unit, the electric information reader, the surface information reader and the temporary storing unit.

9. The sheets handling machine according to claim 7, wherein the electric information reader is installed in the temporary storing unit.

10. In a sheets handling machine for handling sheets, a method for discriminating sheets by a processor of the sheets handling machine, comprising:

executing a first discrimination of a sheet based on information read by a surface information reader for reading surface information on the sheet;

deciding whether a kind of sheet assessed in the first discrimination requires discrimination using electric information from an integrated circuit in a mode set by the processor;

when the result of the decision indicates that the sheet requires discrimination using electric information from the integrated circuit, for executing a second discrimination based on electric information obtained by the electric information reader for reading electric information from the integrated circuit of the sheet; and when the result of the decision indicates that the sheet does not require discrimination using electric information from the integrated circuit, deciding that the sheet is a genuine sheet.

11. The method according to claim 10, further comprising:

comparing the result of the first discrimination with the result of the second discrimination, and if the results coincide, deciding that the sheet is a genuine sheet, and if the results do not coincide, deciding that the sheet is a non-genuine sheet.

12. In a sheets handling machine for handling sheets, a method for discriminating sheets by a processor of the sheets handling machine, comprising:

executing a first discrimination based on information read by a surface information reader for reading surface information on a sheet;

radiating an electromagnetic wave to the sheet from an electric information reader for reading electric information from an integrated circuit;

deciding whether a response from an integrated circuit of the sheet came to the electric information reader;

when a response from the integrated circuit of the sheet came to the electric information reader, referring information on the response to an office; and comparing a kind of sheet determined by the first discrimination with a kind of sheet obtained by reference to the office, and if the kinds coincide, deciding that the sheet is a genuine sheet.

13. The method of discrimination according to claim 12, further comprising:

of deciding a kind of an operation mode set in the processor; and when a response from the integrated circuit of the sheet did not come to the electric information reader and the kind of the operation mode does not require discrimination based on electric information for a first kind of sheet, a decision is made whether the sheet was discriminated as the first kind by a result of the first discrimination, and if the sheet was not discriminated as the first kind of sheet by the result of the first discrimination, a decision is made that the sheet is a non-genuine sheet.

14. A sheets handling machine for handling sheets, comprising:

an input unit for receiving sheets from a user;

a conveyor for conveying sheets;

a temporary storing unit for sequentially storing sheets received from the input unit;

a storing unit for storing sheets stored in the temporary storing unit;

an output unit for ejecting sheets to the user;

an electric information reader for reading electric information of a sheet received at the input unit; and a processor for, out of sheets stored in the temporary storing unit, conveying a sheet identified as a genuine sheet according to electric information read by the electric information reader, to the storing unit by the conveyor, and conveying a sheet identified as a non-genuine sheet according to the electric information read by the electric information reader, to the output unit by the conveyor.

15. The sheets handling machine according to claim 14, further comprising:

a surface information reader for reading surface information of sheets, wherein temporary storage by the temporary storing unit is done for a genuine sheet identified as genuine by a result of reading by the surface information reader, and wherein the processor conveys a sheet not identified as genuine by the result of reading by the surface information reader, to the output unit by the conveyor.

16. The sheets handling machine according to claim 14, further comprising:

a display for displaying a total sum of sheets identified as genuine by the electric information reader; and a key by which to input a confirmation about the sum of money displayed on the display, wherein the conveyance to the storing unit by the processor is executed after a confirmation is input by the key.

17. A sheets handling machine for receiving and conveying sheets, comprising:

an input unit for receiving sheets from a user;

a conveyor for conveying the sheets;

a surface information reader for reading surface information on the sheets received via the input unit;

a temporary storing unit for storing sheets, the surface information of which has been read by the surface information reader; and a storing unit for storing sheets sent out from the temporary storing unit, wherein the temporary storing unit includes an electric information reader for reading electric information on the sheets conveyed to the temporary storing unit.

18. A sheets handling machine for handling sheets, comprising:

a surface information reader for reading surface information on a sheet;

an electric information reader for reading electric information stored in an integrated circuit in the sheet; and a processor for discriminating the sheet by using surface information read by the surface information reader or the electric information read by the electric information reader, wherein the processor switches over between reading and not reading electric information by the electric information reader.

* * * * *

UNITED STATES PATENT AND TRADEMARK OFFICE

CERTIFICATE OF CORRECTION

PATENT NO. : 7,152,793 B2
APPLICATION NO. : 10/998623
DATED : December 26, 2006
INVENTOR(S) : Seiji Ichihara It is certified that error appears in the above-identified patent and that said Letters Patent is hereby corrected as shown below:

On the title page of the Letters Patent,

Under section "(75) Inventor:", change " Seiji Ichihara, Owariashi (JP) " to -- Seiji Ichihara, Owariasahi (JP) --

Signed and Sealed this

Twenty-second Day of May, 2007

JON W. DUDAS
*Director of the United States Patent and Trademark Office*